Patented June 9, 1936

2,043,267

UNITED STATES PATENT OFFICE 2,043,267

PREPARATION OF INSECTICIDES

Vanston H. Ryan and James A. Moran,
Kansas City, Mo.

No Drawing. Application October 2, 1933,
Serial No. 691,820

23 Claims. (Cl. 167—24)

This invention pertains to a novel or improved product adapted to be employed as an insecticide, germicide or parasiticide, and to an improved process of preparing the same.

It is currently well-known that nature produces certain plants, such, for instance, as pyrethrum flowers and derris root, containing compounds that are toxic to insects, germs and parasites. Availing themselves of this knowledge, present day manufacturers of insecticides endeavor, by means of various processes, to extract the toxic compounds from the plants and combine them with a liquid to render them suitable for spraying insects. To accomplish the extraction of the toxins, the following process is universally employed: The plant is steeped in a solvent liquid, usually kerosene, although both alcohols and hydrocarbons will serve, which causes to dissolve and go into solution, a portion of the plant containing (a) the toxins in lesser proportions and (b) miscellaneous tars and inert matters in greater proportions. Next, the liquid is drained off and filtered to cleanse it and improve its appearance, whereupon it becomes a clear kerosene having, in solution therein, the matters (a) and (b) above. When a liquid of this kind, properly diluted, has been obtained, the majority of manufacturers package it in metal containers of various sizes, affix labels thereto, and ship, thus completing the manufacturing process. A few makers follow a somewhat different practice. Realizing the numerous objections to an insecticide containing kerosene, these others distill off the kerosene, leaving a heavy, sticky, reddish-brown residue containing matters (a) and (b) above. This material is commonly termed the oleo-resin extract of pyrethrum. Next, in an effort to render the extract suitable for use with a water base, as contrasted with kerosene, the oleo-resins are emulsified in soft soaps. The emulsified extract is then bottled and sold under instructions for the purchaser to mix it with the proper quantity of water before use. Some manufacturers of insecticides purchase the oleo-resin extract of pyrethrum and instead of emulsifying it with soap, dilute it with kerosene.

From the point of view of the present applicants, both of the above described products are objectionable and unsatisfactory. The justification for this opinion will be established by a recital of a few of their offensive features. The kerosene base spray is highly inflammable, stains material upon which it is sprayed, has a bad odor, a vile taste and in sufficient quantities is poisonous to humans. Similarly, the emulsified extract, when mixed with water, has a bad odor, a vile taste, stains, is unpleasant in appearance and in addition, it has a tendency to lose rapidly its toxic power.

Applicants have discovered a way of so treating the toxic plant extract of pyrethrum flowers or derris root that when mixed with water it will produce a clear, transparent liquid having the full toxic strength, yet having no appreciable odor or taste, non-inflammable, non-poisonous to humans, and stainless. Obviously, such an insecticide has, among other uses, a widespread industrial application, such as dairies, bakeries and the like, that cannot be served by products now on the market. Then also, in addition to its insecticidal properties, it displays a useful phenolic coefficient which renders it suitable for use as a germicide and likewise it has a lethal effect upon parasites, such as *Dermodex folliculorum*, *Ptherius pubis*, cestodes, *Trematodes*, etc.

Another feature of applicants' invention resides in the employment at one stage in the process of a frangible or collapsible container for holding the insecticidal compound antecedent to its mixture with water. Additional features will become apparent from a reading of the following specification.

Before describing the details of the improved process by the practice of which oleo-resin extract of pyrethrum, for instance, is so treated that it will mix with water to form a clear, amber-colored hydroscopic liquid, it might be well to state that applicants appear to have succeeded in rendering soluble in water that portion of the oleo-resin that contains the active toxic principle of pyrethrum. The term "solution" as used in this connection is employed, however, both at this point and hereafter, more for its lay meaning than for its technical intent. Thus, the resultant liquid displays many of the characteristics of a solution although, from the standpoint of strict chemical definition, it may not be a "solution".

The first step in the process is concerned with extracting the active toxic principle of the plant. In the case of pyrethrum flowers the toxins are known as pyrethrin one and pyrethrin two. Although it is physically possible to isolate the pure pyrethrins it is not possible today to do so on a commercially profitable basis. Thus, in practice it is expedient to rely, for the toxic principle, upon the oleo-resin extract which can be obtained, as already described, by soaking the flowers in a solvent and thereafter distilling off the solvent, leaving the oleo-resin as a residue, or it may now be purchased commercially in desired quantities. A currently well-known commercial product is a 13% active oleoresin of pyrethrum and, for the purpose of disclosing the proportions of ingredients employed in the process, that product will be referred to in the following discussion.

It has been discovered, and herein lies a leading aspect of the invention, that alkylolamines of the generic formula $H_2N(C_nH_{2n}OH)_y$, such, for instance, as the ethanolamines of the generic formula $H_2N(C_2H_4OH)_y$ react with the active toxic principle of the pyrethrum to render the latter soluble in water. It may be added that the group of ethanolamines also includes methanolamines of the generic formula $H_2N(CH_2OH)_y$; propanolamines of the generic formula $$H_2N(C_3H_6OH)_y;$$

butanolamines of the generic formula $$H_2N(C_4H_8OH)_y;$$

all of which are sometimes termed "carbinolamines". Thus, in accordance with one practice of the process, to one part by weight of the oleoresin extract is added ths parts by weight of triethanolamine. These are mixed together in a container at a temperature (50° C.–60° C.) slightly below that of decomposition of the pyrethrins and stirred thoroughly. Where the extract of derris- root is used of which rotenone is the main toxic principle, the heat is increased to about 100° C. The heat may be applied in any suitable manner, as for instance, by means of a jacket surrounding the container. When thoroughly mixed, there exists (1) a resultant compound of triethanolamine and pyrethrins (which resultant is soluble in water) and (2) inert tars and resins. At this stage we have accomplished the feat of putting the pyrethrins into a state in which they are soluble in water. They are, however, mixed with the inactive tars and resins which are not soluble in water. If, for instance, our product at this point should be mixed with water, the pyrethrins would go into solution but the tars and resins would become emulsified and as such would incur the same objections that attach to all such emulsions; stain, precipitation and settling, unattractive appearance, etc.

Accordingly, the next step in the process contemplates the saponification of the tars and resins. This is accomplished by the addition of some fatty acid, either saturated or unsaturated, such as oleic acid. Thus, in practice, while the mixture of oleo-resin extract and triethanolamine is still heated, oleic acid is added in an amount equal to the oleo-resin extract present. The batch is now stirred, in the absence of further heat, until the reaction is complete and a smooth, homogeneous mixture is obtained.

At this point it should be stated that of the 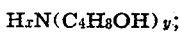ths parts by weight of triethanolamine added in the first step of the process, ⁸⁄₁₀ths parts are excess, which is to say, only ⁵⁄₁₀ths parts are needed to render the pyrethrins water soluble. The excess ⁵⁄₁₀ths parts are added to assist subsequently the oleic acid in reacting with the tars to saponify them. The excess could be added later in the process, as an extra step, but to serve convenience it is added at the outset.

At this point the product contains triethanolamine oleate and tars in a saponified mixture together with a resultant which contains, among other things, the pyrethrins in a water soluble state. At this stage, the product is anhydrous and if mixed directly with water, as in the soap industry, would be soluble. However, the process would be slow and arduous, requiring care and skill. To escape this and to render the product readily soluble a disinterested solvent (one that does not undergo chemical reaction) such, for example, as diethylene glycol mono ethyl ether, commercially listed as carbitol, or alcohols, is added to the product. This agent may be added in any amount, depending upon the bulk and the ease of solubility desired. For instance, to 50 grams of product might be added 5 grams of solvent or, on the other hand, 50 grams of solvent might be added. No experimentation is necessary at this point.

The product, compounded in the aforedescribed manner, is 100% active and when properly mixed with water produces a clear amber fluid having practically no odor or taste.

It will be observed that in the process just described, the inert tars and resins of the oleoresin extract are carried into the final product. Earlier in the application it was stated that we have succeeded in separating out the tars and resins thereby isolating the pure pyrethrins. This has been accomplished by a continuous extraction process, employing methyl alcohol and petroleum ether as a solvent, which eventually causes the desired separation. The pyrethrins thus obtained, can be added to the reagent, such as triethanolamine, at a slight temperature, and the resultant will be water soluble and highly toxic. Thus the invention encompasses the rendering of pyrethrins, whether pure or in an extract, water soluble through the employment of the process herein described.

The product that has now been obtained may be termed an insecticidal, parasiticidal or germicidal concentrate thereby meaning that it contains a toxic principle and is intended, at a subsequent stage to be mixed with a suitable base, which, in this case, is water.

Having thus obtained a batch of liquid comprising the product, the next step contemplates the storing of it pending use. To this end the invention contemplates the employment of a frangible or collapsible container, such, for instance, as a tube or capsule which will exclude the actinic rays of the sun and will protect the contents against moisture and other causes of deterioration. The containers, it is anticipated, will hold an amount of concentrate adapted to be added to a standard measure of water, such as a half-pint, a pint, a quart, a gallon, etc., to produce the required amount of spray. Since the amount of concentrate used in, let us say, a quart of finished insecticide is, in proportion to the amount of water employed, almost negligible, it will be appreciated that the containers for the concentrate will be comparatively small and that considerable freight costs will be saved by shipping the concentrate only, leaving it to the user to add the water base.

Having thus described the invention in language sufficiently clear and exact to enable anyone skilled in the art to practice and compound the same, it is next pointed out that the invention contemplates the employment of equivalents throughout, the prime consideration being that applicants have rendered water soluble the active principle of natural plants toxic to insects.

What we claim as new and desire to secure by Letters Patent of the United States is:

1. A product adapted to serve as concentrate for a germicide, insecticide or parasiticide, comprising a product which is the result of a chemical reaction between the toxic principle of herbs of the class including pyrethrum flowers and derris root with a chemical compound of the alkylolamine family.

2. That improvement in methods of preparing insecticides and the like, which comprises, mixing an extract of an herb of the class including pyrethrum and derris root with an alkylolamine at a temperature shortly below that of decomposition of the toxins contained within the herb of the class including pyrethrum and derris root, whereby such toxins are rendered soluble in water.

3. That improvement in methods of preparing insecticides and the like, which comprises, mixing an extract of an herb of the class including pyrethrum and derris root with an alkylolamine at a temperature shortly below that of decomposition of the toxins contained within the herb of the class including pyrethrum and derris root, and thereafter adding to the mixture a quantity of a fatty acid to cause saponification of tars and resins contained therein.

4. That improvement in methods of preparing insecticides and the like, which comprises, mixing an extract of herbs of the class including pyrethrum and derris root with an alkylolamine at a temperature shortly below that of decomposition of the toxins contained within the herb of the class including pyrethrum and derris root, and thereafter adding a quantity of oleic acid to the mixture and subsequently adding a disinterested solvent thereto.

5. The process of rendering soluble in water the toxic principle of natural plants of the class including pyrethrum flowers and derris root which consists in digesting such principle with an alkylolamine.

6. A product of the character described comprising a water solution of a chemical compound which is the result of chemical combination between a member of the alkylolamine family and a pyrethrin.

7. A product of the character described comprising a solution in water of a chemical compound which is the result of chemical combination of a member of the ethanolamine family and a toxic botanical extract of the class including pyrethrum and rotenone.

8. A product of the character described comprising a solution in water of the chemical compound resulting from a chemical combination between triethanolamine and a toxic botanical extract of the class including pyrethrum and rotenone.

9. A concentrate of the character described comprising an extract of an herb of the class including pyrethrum and derris root rendered soluble by chemical reaction with a member of the alkylolamine family.

10. A concentrate of the character described comprising a toxic extract of an herb of the class including pyrethrum and derris root rendered soluble by chemical reaction with a member of the ethanolamine family.

11. A concentrate of the character described comprising a toxic extract of an herb of the class including pyrethrum and derris root rendered soluble by chemical reaction with triethanolamine.

12. A concentrate of the character described comprising an extract of an herb of the class including pyrethrum and derris root rendered soluble by chemical reaction with a member of the alkylolamine family in the presence of a fatty acid.

13. A concentrate of the character described comprising an extract of an herb of the class including pyrethrum and derris root rendered soluble by chemical reaction with a member of the ethanolamine family, in the presence of a fatty acid.

14. A concentrate of the character described comprising an extract of an herb of the class including pyrethrum and derris root rendered soluble by chemical reaction with triethanolamine, in the presence of a fatty acid.

15. A concentrate of the character described comprising an extract of an herb of the class including pyrethrum and derris root rendered soluble by chemical reaction with a member of the alkylolamine family in the presence of a fatty acid and a disinterested solvent.

16. A concentrate of the character described comprising an extract of an herb of the class including pyrethrum and derris root rendered soluble by chemical reaction with a member of the ethanolamine family in the presence of a fatty acid and a disinterested solvent.

17. A concentrate of the character described comprising an extract of an herb of the class including pyrethrum and derris root rendered soluble by chemical reaction with triethanolamine, in the presence of a fatty acid and a disinterested solvent.

18. A product adapted to serve as a germicide, insecticide or parasiticide, comprising a water soluble alkylolamine derivative of the active toxic principle of herbs of the class including pyrethrum flowers and derris root.

19. A product adapted to serve as a concentrate for a germicide, insecticide or parasiticide, comprising a product which is the result of a chemical reaction between the toxic principle of herbs of the class including pyrethrum flowers and derris root with methanolamine.

20. A product adapted to serve as a concentrate for a germicide, insecticide or parasiticide, comprising a product which is the result of a chemical reaction between the toxic principle of herbs of the class including pyrethrum flowers and derris root with ethanolamine.

21. A product adapted to serve as a concentrate for a germicide, insecticide or parasiticide, comprising a product which is the result of a chemical reaction between the toxic principle of herbs of the class including pyrethrum flowers and derris root with triethanolamine.

22. That improvement in the method of preparing insecticides and the like, which comprises treating an extract of an herb of the class including pyrethrum flowers and derris root with a chemical compound of the alkylolamine family in the presence of water.

23. That improvement in the method of preparing insecticides and the like, which comprises treating an extract of an herb of the class including pyrethrum flowers and derris root with a chemical compound of the ethanolamine family in the presence of water.

VANSTON H. RYAN.
JAMES A. MORAN.